Patented May 29, 1928.

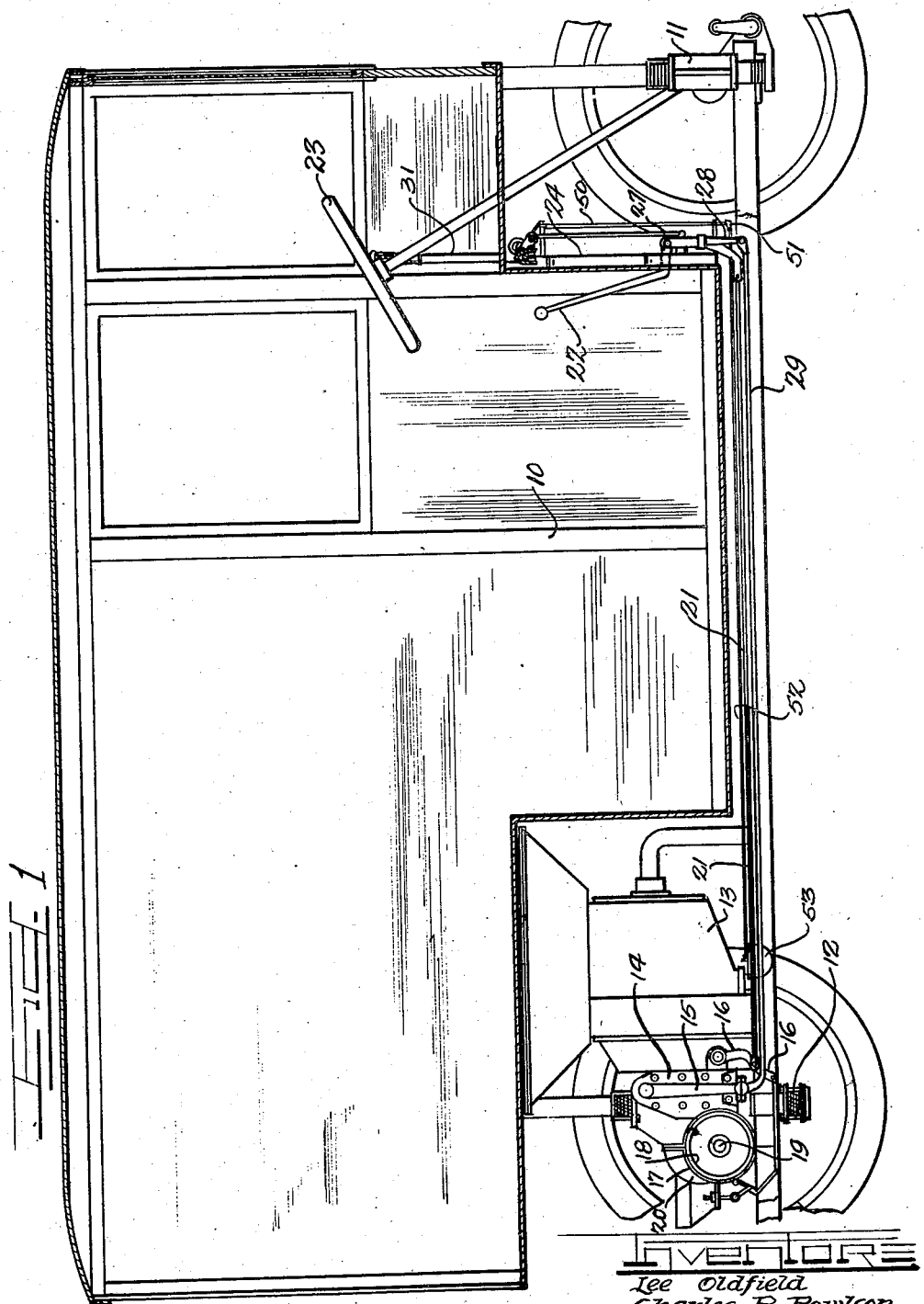

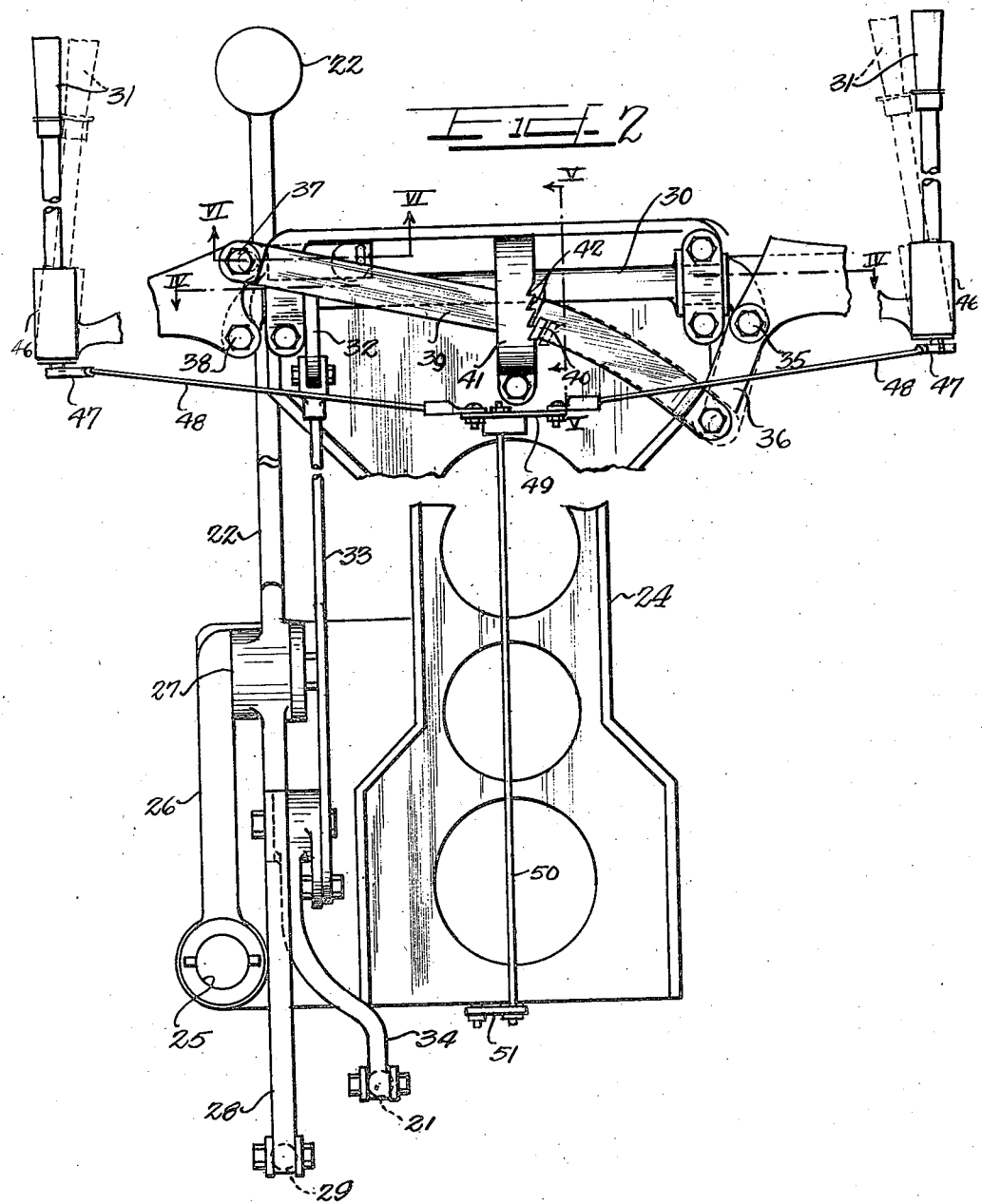

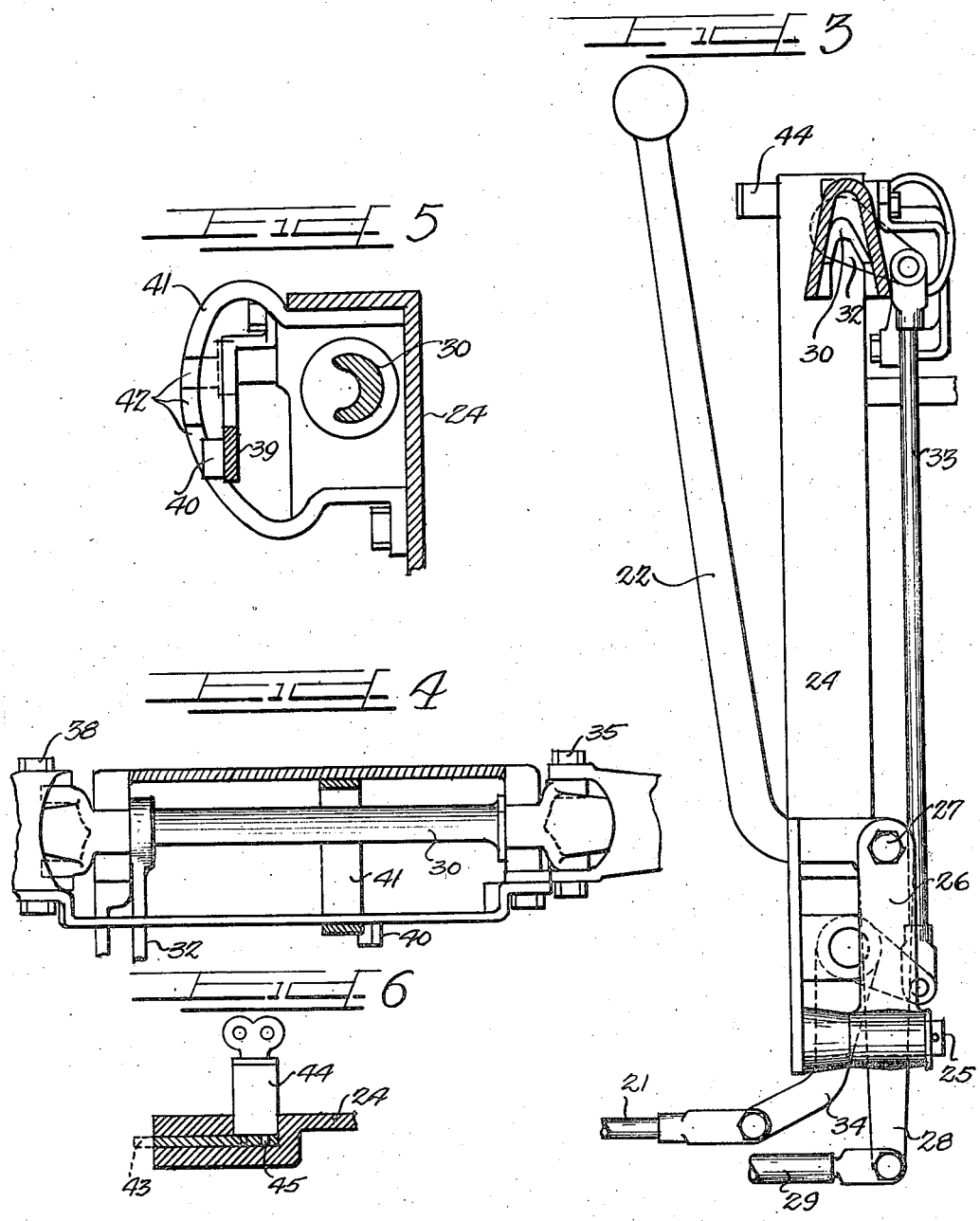

1,671,375

UNITED STATES PATENT OFFICE.

LEE OLDFIELD AND CHARLES R. ROWLSON, OF CHICAGO, ILLINOIS.

VEHICLE CONTROL.

Application filed June 13, 1925. Serial No. 36,831.

This invention relates to the transmission, clutch and brake controls of an automotive vehicle and particularly to such controls concentrated in a single lever except for the transmission speed changes.

It is an object of this invention to provide an improved and simplified control system for vehicles, especially commercial vehicles engaged in delivery services involving very frequent stops and starts, sometimes approximating house to house delivery where the operator spends more time outside the vehicle than in driving from point to point. The present invention is intended to provide an operating control in duplicate so that the operator can reach in from either side of the vehicle and control throttle, clutch and brake by a single hand lever while either walking beside the vehicle or standing in the entrance.

It is also an object of this invention to provide a clutch and brake operating mechanism wherein a lever is pivoted to move in two planes, fore and aft movement, controlling the clutch and brake and sideways movement latching the brake mechanism.

It is a further object of this invention to provide multiple clutch and brake operating levers positioned adjacent either entrance to a vehicle and to provide brake latching mechanism initially engageable by either control lever and disengageable by either lever in order that the driver may start up the vehicle from either entrance regardless of the particular lever he used to apply the brakes.

Other and further important objects of this invention will be apparent from the disclosures in the specification and the accompanying drawings.

This invention (in a preferred form) is illustrated in the drawings and hereinafter more fully described.

On the drawings:

Figure 1 is a longitudinal section of a vehicle embodying one form of this invention.

Figure 2 is an enlarged rear elevation of the control lever panel.

Figure 3 is an elevation from the left of Figure 2.

Figure 4 is a section on the line IV—IV of Fig. 2.

Figure 5 is a section on the line V—V of Figure 2.

Figure 6 is a section on the line VI—VI of Fig. 2.

As shown on the drawings:

A vehicle body 10 of a commercial type is shown in longitudinal section, together with the front and rear wheel assemblies 11 and 12 and the power plant 13 associated with the rear wheel assembly. This structure is described in detail in our co-pending application for motor vehicle, Serial Number 36,830, filed June 13, 1925. The elements of the power plant transmission 14 which are operated by the control of the present invention comprise the gear shifting lever 15, fore and aft motion of which gives the speed changes; and the clutch throwout lever 16, the lower end of which is connected by linkage to band brakes 17 operating on drums 18 mounted on the projecting ends of the axle shaft 19 outside the differential housing 20. This connection serves to engage the clutch when the rod 21 is pushed back, and to release the clutch and engage the brakes when the rod is pulled forward.

The gear shifting lever 15 on the transmission is controlled by the hand lever 22 positioned conveniently in the vehicle adjacent the steering wheel 23 and having a double pivot mounting on a supporting bracket 24 comprising the stud 25 carrying a transversely pivoted arm 26 the end of which carries a longitudinal pivot 27 for the hand lever 22 the projecting end 28 of which engages the rod 29 connected to the lever 14. Fore and aft motion of the lever 22 gives the speed changes for ahead motion, the intermediate position providing a neutral. In this position a transverse movement of the lever 22 shifts the reverse gearing of the transmission into engagement as described in our co-pending application.

The clutch and brake control comprises a transverse shaft 30 having levers 31 pivoted to either end thereof and operating the clutch and brake by means of the lever 32, rod 33, bell crank 34 and connecting rod 21. Rotation of the shaft 30 by moving either lever 31 forward serves to engage the clutch, and rearward movement disengages the clutch and applies the brakes.

In order to provide a latch for the brake mechanism each lever 31 has a pivoted connection 35 to the shaft 30 permitting movement of the lever towards the center of the vehicle. Each lever 31 is therefore a form of bell crank, the crank arm 36 in the case of the right hand lever extending downwardly from the pivot 35. In the left hand lever the crank arm is formed by a pin 37 offset upwardly from the lever pivot 38, and the pin 37 and crank arm 36 are connected by a bar 39 having a tooth or dog 40 thereon. A quadrant 41 is provided with teeth 42 to engage the dog 40 when the bar 39 is shifted to the left, as shown by the full lines in Figure 2. This is the normal position with the levers 31 upright or at right angles to the shaft 30, the dog being disengaged by moving either lever towards the center of the vehicle, as shown by the dotted lines in Figure 2. The quadrant is so shaped as to conform to the rotation of the bar 39 about the shaft 30 so that a series of teeth provide a graduated brake adjustment corresponding to the usual brake lever and quadrant. The particular linkage of the two levers 31 to the bar 39 gives a symmetrical control in that movement of either lever inwardly produces the same effect. The advantages of the dual control permit the driver to set the brake from one side upon leaving and to release the brake from either side upon returning.

In order to provide a lock for the control mechanism, a sliding bar 43 mounted in the bracket 24 (see Figure 6) is adapted to be projected by a key operated cylinder 44 and eccentric pin 45 to abut against one lever 31 adjacent the pin 37 to prevent transverse movement thereof, thus effectively locking the brake in engaged position, as the linkage between the two levers 31 prevents movement of one lever when the other is held stationary.

The levers 31 are rotatably mounted in the bosses 46 and extend therethrough, terminating in cranks 47 to which are pinned rods 48 leading to a wrist plate 49 on the vertical shaft 50, the lower end of which carries a lever 51 engaging the throttle control rod 52 leading to the engine carburetor 53. This throttle actuating mechanism gives a control analogous to the handle control of a motorcycle except that either of the levers 31 can actuate the control so that the operator has complete control of the vehicle clutch, brakes and speed by means of a single lever.

When a series of deliveries are to be made with only short distances to be travelled by the vehicle between deliveries, the driver may set the gear shift lever in low and control the vehicle solely by means of the clutch and brake levers, pulling back the lever and shifting it laterally to latch the brake in engaged position each time he leaves the vehicle. Upon returning to the vehicle releasing the latch and moving the lever forward engages the clutch and advances the vehicle, it being evident that the driver need not enter the vehicle to accomplish this operation and he can also operate the steering wheel if necessary from either side. The advantages of such a control for milk and ice as well as package deliveries will be evident as the space between successive deliveries may be only a few feet and the driver can advance the vehicle without entering the driving compartment and can thereby save considerable time.

We are aware that many changes may be made and numerous details of construction may be varied through a wide range without departing from the principles of this invention, and we therefore do not purpose limiting the patent granted hereon, otherwise than necessitated by the prior art.

We claim as our invention:

1. A clutch and brake control for automotive vehicles, comprising interconnected control levers adapted to be positioned adjacent the vehicle entrances, means actuated by the longitudinal movement of said levers adapted to control the clutch and brakes of the vehicle, and means actuated by the transverse movement of the levers adapted to latch said levers in the desired position, said latching means being operatable and releasable by either lever.

2. A clutch and brake control for automotive vehicles, comprising interconnected control levers adapted to be positioned adjacent the vehicle entrances, means actuated by the longitudinal movement of said levers adapted to control the clutch and brakes of the vehicle, means actuated by the transverse movement of the levers adapted to latch said levers in the desired position, said latching means being operatable and releasable by either lever, and locking means adapted to prevent the transverse movement of either lever to prevent unauthorized release of the latching means.

3. In a dual control of the class described, a shaft, a pair of levers pivoted to the shaft, clutch and brake mechanism operated by said shaft, a brake latch interconnected to both levers and rotatable with said shaft, and a fixed quadrant engageable by said latch.

4. In a dual control of the class described, a shaft, a pair of levers pivoted to the shaft, clutch and brake mechanism operated by said shaft, a brake latch interconnected to both levers and rotatable with said shaft, a fixed quadrant engageable by said latch, and a lock adapted to abut against one of said levers to prevent movement thereof relative to the shaft.

5. In a dual control for vehicles, a shaft connected to actuate the clutch and brake mechanisms of the vehicle according to the direction of rotation of the shaft, levers pivoted to said shaft to partially rotate the shaft, and brake latching mechanism connected to said pivoted levers and adapted to be latched and unlatched by either lever without regard to which lever was used to apply the latch.

6. A control for vehicles of the class described, comprising duplicate control lovers positioned one adjacent either side of the vehicle, interconnecting linkage therebetween adapted to control the vehicle clutch and brake mechanism and means operatable by either lever to latch and release the brake.

7. A control for vehicles of the class described, comprising duplicate control levers positioned one adjacent either side of the vehicle, interconnecting linkage therebetween adapted to control the vehicle clutch and brake mechanism, means operatable by either lever to latch and release the brake, and means adapted to lock the mechanism with the brakes latched.

8. In an automotive vehicle including a body, a chassis, and a power plant, duplicate levers mounted adjacent the points of entrance of the body, said levers being rotatable and tiltable, means adapted to be actuated by the rotation of said levers adapted to control the power plant output, means adapted to be actuated by the tilting of said lever in one direction to control the driving engagement of the power plant and to apply the vehicle brakes by an opposite movement of said lever.

In testimony whereof, we have hereunto subscribed our names.

LEE OLDFIELD.
CHARLES R. ROWLSON.